US011299288B2

(12) United States Patent
Li et al.

(10) Patent No.: US 11,299,288 B2
(45) Date of Patent: Apr. 12, 2022

(54) METHOD OF PRESENTING FLIGHT DATA OF AN AIRCRAFT AND A GRAPHICAL USER INTERFACE FOR USE WITH THE SAME

(71) Applicant: City University of Hong Kong, Kowloon (HK)

(72) Inventors: Lishuai Li, Kowloon (HK); Florent Charruaud, Sheung Wan (HK); Weizun Zhao, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/358,902

(22) Filed: Mar. 20, 2019

(65) Prior Publication Data
US 2020/0298993 A1    Sep. 24, 2020

(51) Int. Cl.
*B64D 43/00*    (2006.01)
*G06F 16/22*    (2019.01)
*G06F 16/23*    (2019.01)
*G08G 5/00*    (2006.01)

(52) U.S. Cl.
CPC ............ *B64D 43/00* (2013.01); *G06F 16/22* (2019.01); *G06F 16/2365* (2019.01); *G08G 5/0017* (2013.01)

(58) Field of Classification Search
CPC .. B64D 43/00; G08G 5/0017; G06F 16/2365; G06F 16/22
See application file for complete search history.

(56) References Cited

U.S. PATENT DOCUMENTS

| 7,937,334 | B2 | 5/2011 | Bonissone et al. |
| 9,346,557 | B2 * | 5/2016 | Jesse ..................... B64D 45/00 |
| 2011/0246001 | A1 | 10/2011 | Shavit |
| 2015/0324501 | A1 * | 11/2015 | Desell ..................... G06F 30/20 |
| | | | 703/2 |
| 2016/0093222 | A1 * | 3/2016 | Hale ..................... G08G 5/0021 |
| | | | 701/120 |

FOREIGN PATENT DOCUMENTS

| CA | 2868922 | 10/2013 |
| CN | 102163236 | 8/2011 |
| CN | 103080954 | 5/2013 |
| CN | 104246637 | 8/2016 |
| CN | 104321708 | 12/2016 |

* cited by examiner

*Primary Examiner* — Quan Zhen Wang
*Assistant Examiner* — Rajsheed O Black-Childress
(74) *Attorney, Agent, or Firm* — Renner Kenner Greive Bobak Taylor & Weber

(57) ABSTRACT

A method of presenting flight data of one or more aircrafts, including the steps of: receiving dataset associated with the aircraft from a data management system; applying an analysis process to compare at least two portions of the received dataset; and presenting the analysed data portions to a user in a visualized manner. A graphical user interface is also included for use with the method.

23 Claims, 7 Drawing Sheets

METHOD OF PRESENTING FLIGHT DATA OF AN AIRCRAFT AND A GRAPHICAL USER INTERFACE FOR USE WITH THE SAME

TECHNICAL FIELD

The present invention relates to a method of presenting data to a user and a graphical user interface for use with the same, and particularly, although not exclusively, to a method of analysing and presenting flight data of a group of aircraft and a graphical user interface for use with the same.

BACKGROUND

Over the past decades, flight data have been used by airlines for analysis to monitor flight operations and safety. Flight parameters such as airspeed, altitude, engine speed are computed from sensors such as pressure sensors and engine sensors and subsequently recorded in real-time during a flight by Flight Data Recorders (FDR) commonly known as "Black Box" at a certain frequency.

Some aircrafts are also equipped with a Quick Access Recorder (QAR) to allow flight operators to extensively monitor their flight data, so that they could improve their flight operations and most importantly, safety.

Despite aircrafts are equipped with such recording equipment, all the flight data recorded are used for accident investigations and exceedance detections and yet to be fully utilised.

SUMMARY OF THE INVENTION

In accordance with a first aspect of the present invention, there is provided a method of presenting flight data of one or more aircrafts, comprising the steps of:

a. receiving dataset associated with the aircraft from a data management system;

b. applying an analysis process to compare at least two portions of the received dataset; and c. presenting the analyzed data portions to a user in a visualized manner.

In an embodiment of the first aspect, step b includes step b1 of identifying common data patterns in the received dataset.

In an embodiment of the first aspect, step b includes step b2 of detecting anomalies with reference to common data patterns in the received dataset.

In an embodiment of the first aspect, step b includes step b3 of comparing at least two data patterns each representing different portions in the received dataset.

In an embodiment of the first aspect, step c includes step c1 of representing the analyzed data graphically whereby two patterns associated with two different portions of the received dataset are visibly distinguishable from each other by a user.

In an embodiment of the first aspect, step a includes step a1 of converting binary flight data recorded by a local recording means of an aircraft into engineering flight data.

In an embodiment of the first aspect, step a includes step a2 of removing erroneous data from the engineering flight data.

In an embodiment of the first aspect, step a includes step a3 of extracting flight sectors of an individual flight from the cleaned flight data.

In an embodiment of the first aspect, step a includes step a4 of retrieving flight basic information from the extracted flight sectors.

In an embodiment of the first aspect, step a includes step a5 of storing retrieved flight basic information into database of the data management system.

In an embodiment of the first aspect, the local recording means includes at least one of the Quick Access Recorder and Flight Data Recorder.

In an embodiment of the first aspect, the data management system includes a storage unit for storing data.

In an embodiment of the first aspect, the stored data includes analysis result processed by analysis process in step b.

In an embodiment of the first aspect, the stored data includes analysis parameters associated with the analysis process in step b.

In an embodiment of the first aspect, the stored data includes information associated with at least one of the airport, runway, and airline fleet.

In an embodiment of the first aspect, further includes step b0, prior to step b, of configuring the analysis parameters.

In an embodiment of the first aspect, further includes step d, following step c, of storing the configured analysis parameters.

In accordance with a second aspect of the present invention, there is provided a graphical user interface for use with the method of the present invention.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
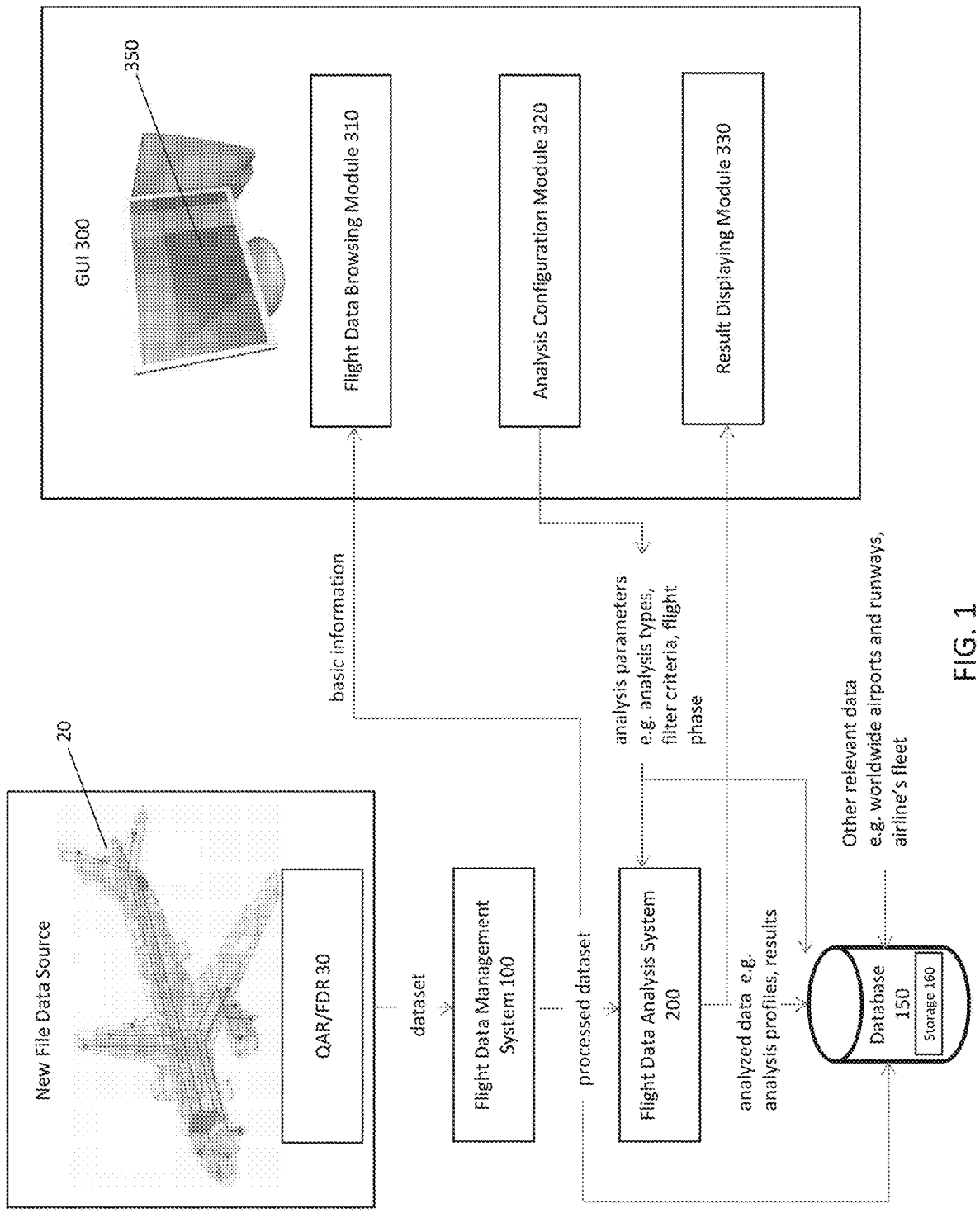
FIG. 1 is a schematic diagram showing the principal components for implementing a method of presenting flight data of an aircraft in accordance with one embodiment of the present invention.

Without wishing to be bound by theories, the inventors, through their own trials and experiments, have devised that current systems on the market use an analytics method called "Exceedance Detection" (ED), which is one type of analysis used for detecting Exceedance events i.e. hazardous events in the flight data obtained from FRD or QAR. From data collected during accident investigations, the flight operators can take anticipated means to correct the hazard causes, thereby preventing accidents from happening.

However, these hazardous events are defined based on domain knowledge and known issues such as data from past accidents, which makes the analysis efficient yet limited.

Most importantly, they are not able to detect unknown anomalies. The ED method may only be deployed for post-accident analysis and the analysis is substantially conducted with hindsight which may not necessarily be objective.

Furthermore, the definitions of events are stored in a library and need to be maintained regularly and this has to be configured for each aircraft type. This represents an enormous work as there are hundreds of events for each aircraft in an airline's fleet. Besides, there is no way of visualizing analysis results. Flight data experts must visualize the raw data and simulate the flight phase where events occur.

The inventors also devised that the aviation industry is quite reticent about moving toward new types of analytical technologies such as data mining, machine learning etc. In the huge amount of data daily collected, there is so much information left unexploited.

In the present invention, there is provided a cluster-based method for identifying common flight data patterns without any domain knowledge and data from past accidents. There is also provided a system for integrating with the cluster-based method thereby identifying common flight data patterns and abnormal flights in flight data and presenting the patterns to the user. Any abnormal flights may be predicted without knowing exactly the characteristic of such unknown anomalies.

In one example embodiment, the present invention enables airlines to analyse flight data recorded during daily operations by using application software, and to identify and compare common flight data patterns and detect abnormal flights from QAR or FDR data without any past accident data and domain knowledge. Data Analytics results including common flight data patterns and abnormal flights can be visualized using graphs for each flight parameters included in the analysed flight data.

There is also provided application software to allow flight data experts to interact with the analysis system.

The present invention has utility in the Flight Data Monitoring (FDM) program or Flight Operational Quality Assurance (FOQA) program adopted by flight operators to daily collect and analyse operational flight data in order to maintain/improve flight safety, aircraft maintenance and performance, flight operations and, pilot training programs.

With reference initially to FIG. 1, there is provided a method of presenting flight data of an aircraft 20, comprising the steps of: receiving dataset associated with the aircraft 20 from a data management system 100; applying an analysis process to compare at least two portions of the received dataset; and presenting the analysed data portions to a user in a visualized manner.

The flight record of a flight 20 is stored in local recording means 30 as a dataset. For instance, the local recording means 30 may be a Flight Data Recorders (FDR) or a Quick Access Recorder (QAR). The essential flight data include but not limited to airspeed, altitude, engine speed, angle of attack etc. Upon arriving an airline's hub, the flight dataset stored in the FDR or QAR, i.e. data source of flight data are uploaded to and collected by a data server of an airline for data processing.

As various format are used for storing the flight data by different airline and aircraft model, the flight data are automatically processed by an application software and converted to a standard format or protocol such that flight data experts may interact with one or more computer systems provided by the present invention for performing flight data analysis, processing and storing data originated from different data sources respectively.

Figure 2:
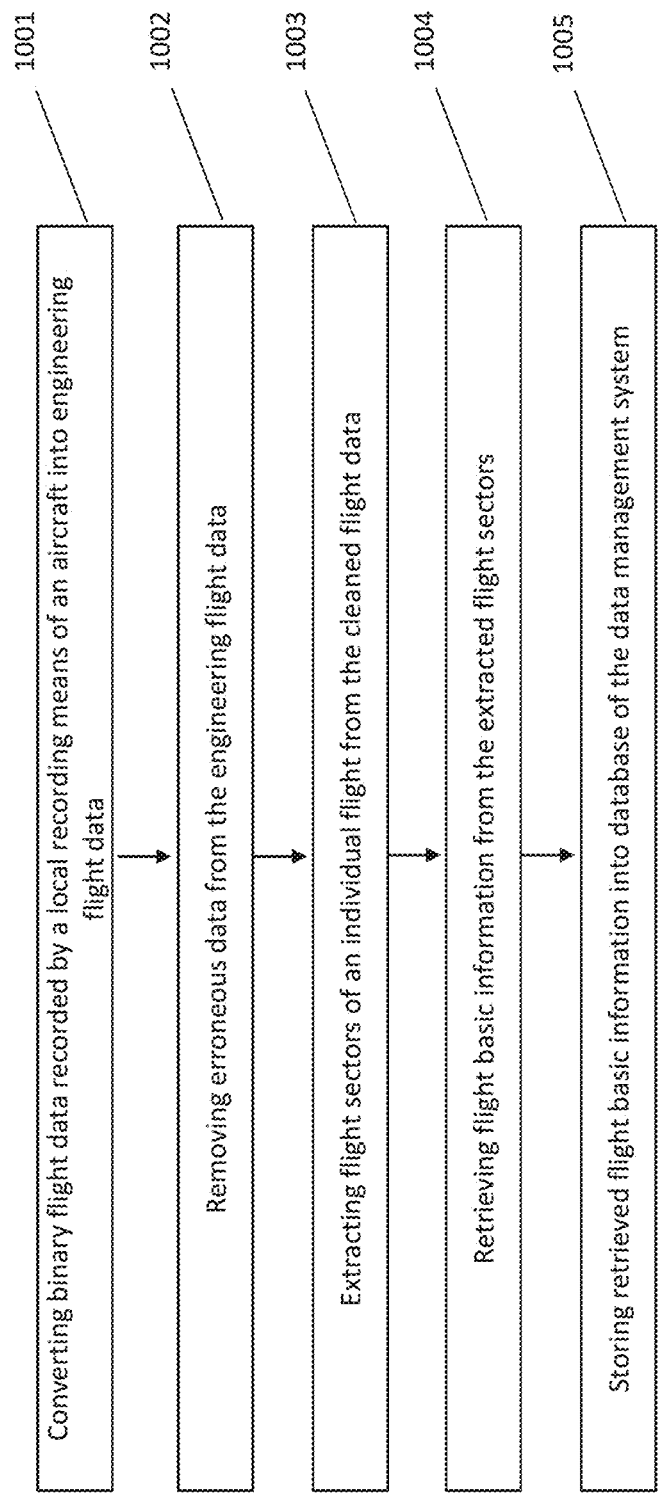
FIG. 2 is a schematic diagram showing the workflow of the flight data management system in FIG. 1.

With reference to FIG. 2, the present invention includes a flight data management system 100 for computer-implementing a digital system for performing a series of processing method. The processing module 100 is automatically executed for processing and storing flight data in a specific way and format to be analysed later by other analysis system, such as flight data analysis system 200.

Initially, the system 100 would detect if there presents any new flight data for processing. Upon detection of new raw flight data stored in a file data source 30, the processing module 100 would be automatically executed for processing and storing flight data in a specific way and format to be analysed later. For instance, the raw flight data, which is initially recorded by Quick Access Recorders (QAR) as binary values, is converted into engineering flight data at step 1001.

However, these engineering flight data may contain erroneous samples which could have influences on the analysis accuracy. To reduce as much uncertainty as possible from the analysis, the engineering flight data are cleaned by removing the erroneous data at step 1002.

In a flight data, one data frame may contain one or more flight sectors. For instance, one data frame may include hundreds of short and long haul flights during one month covering different destinations. To locate each of the flight individually, the plurality of flight sectors are extracted as individual flights at step 1003. Upon locating the flight sectors, the flight basic information are collected from each sector at step 1004 and subsequently stored into the system database 150 at step 1005.

To store the information and analysis result in the system database 150, the data management system 100 may include a storage unit 160. The storage unit 160 may include worldwide airports and runways, airline's fleet of all operational aircrafts, and flight data e.g. flight parameters recorded over time. The storage unit 160 may also include other analysis profiles such as configured analysis and the relevant analysis results.

In one example embodiment, the present invention also includes a computer system 200 for analysing flight data and a method of analysing the flight data in order to identify and output common flight data patterns and uncommon flights, qualified as abnormal flights without any prior accident data, domain knowledge or criteria.

In particular, the flight data analysis system 200 is able to complete different types of flight data analysis, for instance, common patterns identification, anomaly detection, and pattern comparison. The results processed by any of these analysis processes would be stored in the storage unit of the flight data management system 100.

In one example embodiment of common patterns identification, the system uses clustering algorithms to identify the common data patterns in a flight dataset. By analysing a set of flight parameters over a phase of flight, different data patterns can be identified. These data patterns are made up of flights following the same standard operating procedure defined by an airline.

In one example embodiment of anomaly detection, the system uses a clustering algorithm, for instance, DBSCAN to detect anomalies in flight data. By analysing a set of flight parameters over a phase of flight, flights following the identical standard operating procedure are clustered into groups represented as data patterns. Based on these data patterns, flights that haven't been clustered are anomalous flights and might be abnormal.

In one example embodiment of pattern comparison, the system computes statistics (or percentiles) of two flight data sets to compare their two representing data patterns in various aspect, including but not limited to engine parameters, aircraft position, speeds, accelerations, attitudes, control surface positions, and wind information.

Figure 3:
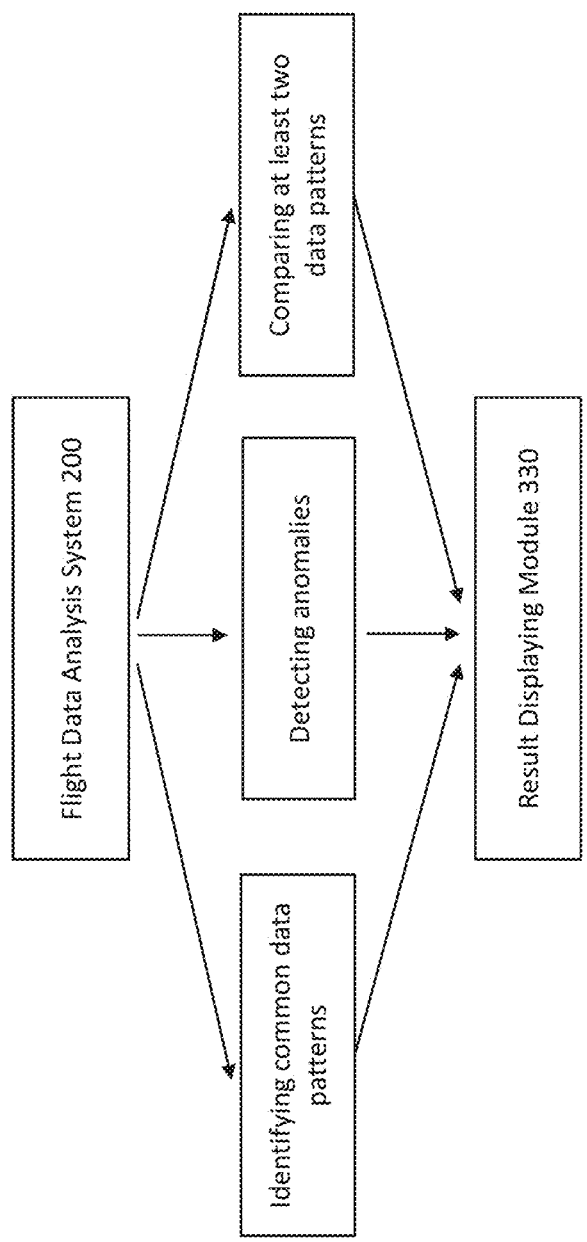
FIG. 3 is a schematic diagram showing the interaction between the flight data analysis system and the graphical user interface in FIG. 1.

With reference to FIG. 3, the present invention includes application software for interacting with the flight data management system 100 and the flight data analysis system 200, such that executed flight data analytics from the flight data analysis system 200 may be visualised and presented to the user for further inspections.

To facilitate the interaction between the application software and the user, there is also provided a graphical User Interface (GUI) 300 for instance a browsing screen 350 embedded on an electronic device e.g. personal computer, laptop, mobile phone, tablet etc. which allows flight data experts to manage their flight data, their flight data analysis and analysis results. The users may conduct different types of flight data analysis and visualization with a light and flexible configuration.

Figure 4:
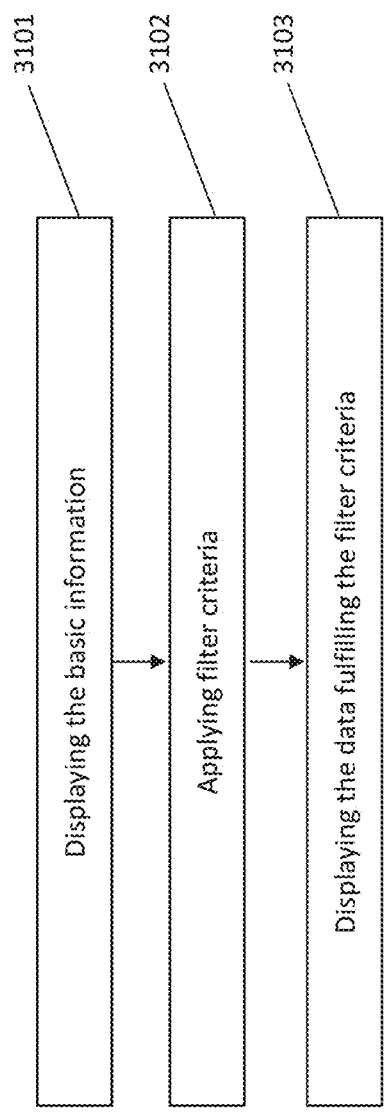
FIG. 4 is a schematic diagram showing the workflow of flight data browsing module in FIG. 1.

With reference to FIGS. 1 and 4, there is provided a flight data browsing module 310. The flight data browsing module 310 provides an overview of the airline fleet with basic information available in the system e.g. aircraft type, number of aircraft operating and number of flight and a route-map of each aircraft type at step 3101. The user may focus on particular issues, for instance by picking one or more filters criteria such as aircraft type and id, flight number, crew id, origin airport and runway, destination airport and runway and take-off date etc. at step 3102. The data filtered by the selected criteria will be displayed on the browsing screen 350 at 3103.

Figure 5:
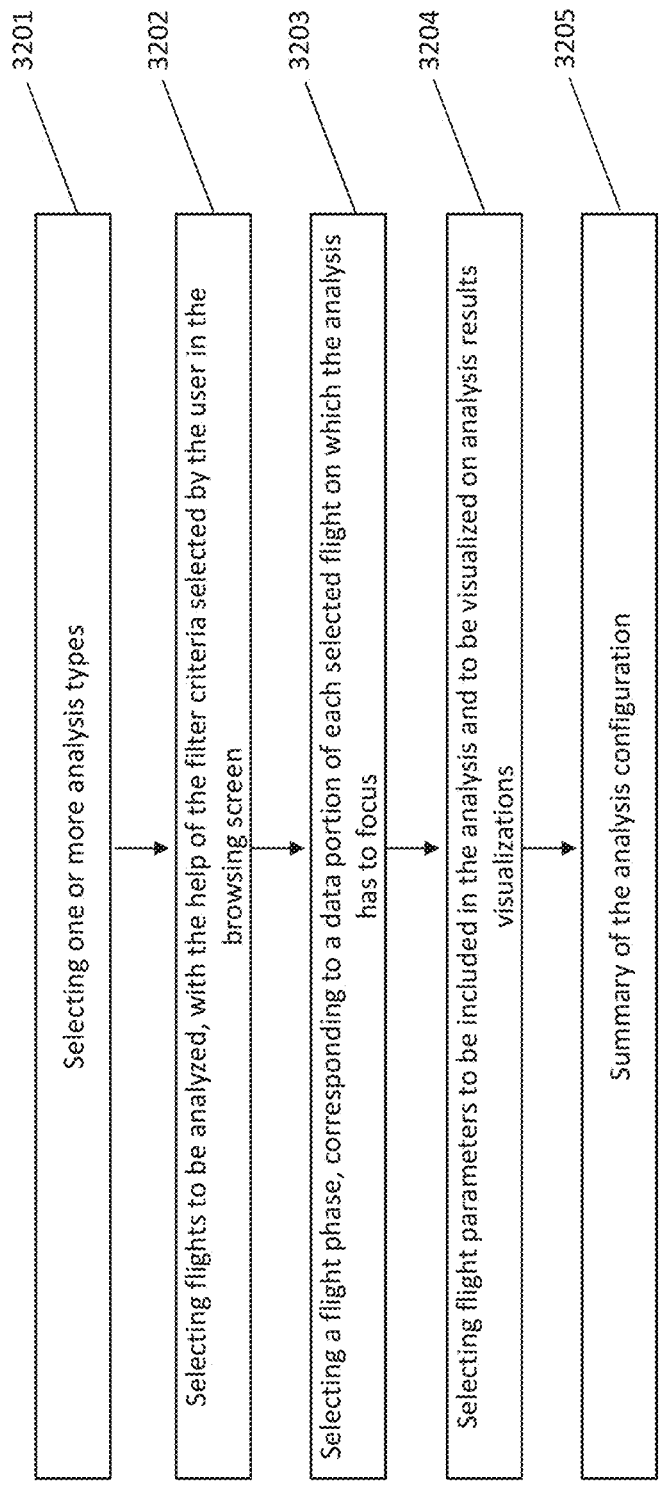
FIG. 5 is a schematic diagram showing the workflow of analysis configuration module in FIG. 1.

With reference to FIGS. 1 and 5, there is also provided an analysis configuration module 320 organized by subsections for different operational actions. Initially, the user may select one or more analysis types among common patterns identification, anomaly detection and pattern comparison performed previously by the flight data analysis system 200 at step 3201. The user may next select flights to be analysed, with the help of the filter criteria preselected by the user (at step 3102) in the browsing screen 350 at step 3202.

The user may select a flight phase, corresponding to a data portion of each selected flight (e.g. only part of the journey from Hong Kong International Airport to London Heathrow Airport) on which the analysis has to focus at step 3203. The user may then select flight parameters to be included in the analysis and to be visualized on analysis results visualizations at step 3204. Before proceeding to the analysis, a summary of the analysis configuration is displayed on the browsing screen 350 for review and confirmation by the user at step 3205. These configurations i.e. analysis parameters would be stored in the storage unit 160 for quick reference in the future.

Figure 6:
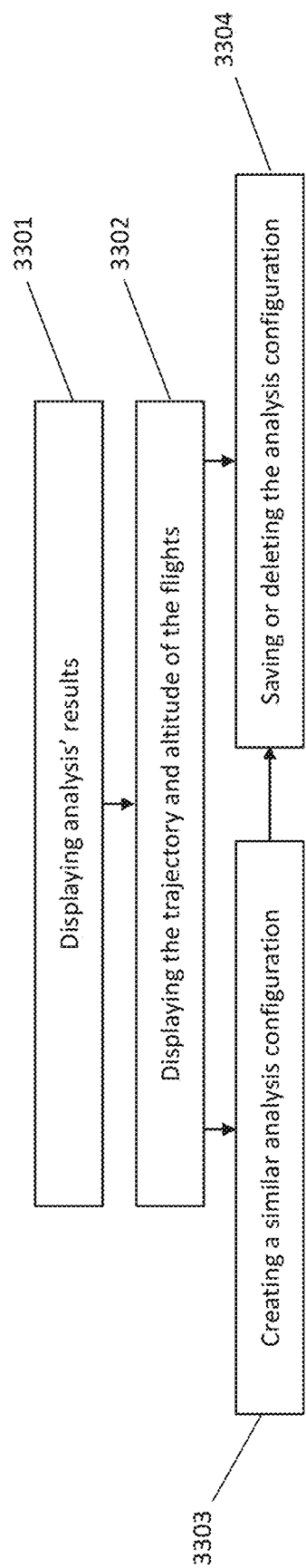
FIG. 6 is a schematic diagram showing the workflow of the result displaying module in FIG. 1.

With reference to FIGS. 1 and 6, there is further provided a result displaying module 330 for presenting to the user an overview of all created analyses. Each analysis is displayed with its basic information (name, description, status, analysis types) and action buttons. The analysis results, including a summary of the different types of analysis, summary of the identified or compared patterns and their corresponding route-map, and a summary of flights detected as abnormal, would be displayed in analysis results page at step 3301. Two or more patterns, where each represents different portions of the flight data or different flight data graphically, would be visibly distinguishable from each other by a user.

From the summary page user can either open the chart report to look at the visualizations or download a Google Earth file to have a look at the trajectory and altitude of the flights 30 in the identified or compared patterns at step 3302. The user may also create another similar analysis configuration for example with refined criteria at step 3303. Upon completion of the analysis, the user may store the analysis configuration into the database 150 or alternatively, delete the analysis configuration from the database 150 at step 3304.

Figure 7:
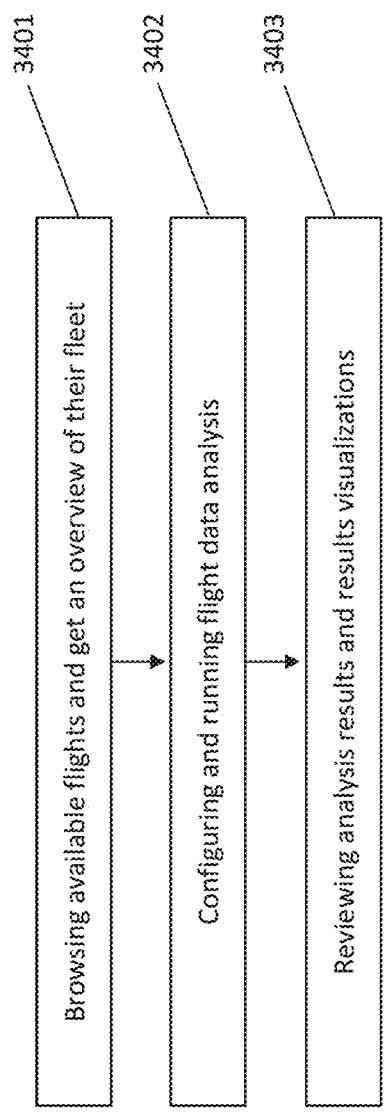
FIG. 7 is a schematic diagram showing the workflow of the Graphical User Interface in FIG. 1.

With reference finally to FIG. 7 for the detailed description of the general operating procedure of the application software on the GUI 300. Once flight data are stored in the database 150, they are available on the application software. A user can use the application software interface 300 to browse available flights and get an overview of their fleet at step 3401.

Next, the user may configure and run one or more aforementioned flight data analysis at step 3402. In particular, the user needs to select the types of analysis to be run by the system, the flights to be analysed, the phase of flight to be analysed, and flight parameters to be computed in the analysis. Finally, the analysis result and the results visualization would be displayed on the application software interface 300.

Advantageously, the flight data management system 100 automatically processes the raw data on airlines servers and stores the processed flight data on the storage unit 160. Data experts can browse the data, define what kind of analysis they want to conduct, and visualize the results using graphs. The visualizations may also give additional information to the events about the flight data and airlines' flight operations which otherwise would not be readily detected by conventional ED method.

When the user runs the configured analysis, the configuration is sent to the storage unit 160 and to the flight data analysis system 200. The flight data analysis system 200 reads the analysis configuration, prepares the flight data by getting the selected flights, extracting the selected flight parameters and extracting the selected phase of flight. Then the flight data analysis system 200 will execute the analysis to identify the common flight data patterns and abnormal flights and stores the results in the storage unit 160. Once the results are stored in the database, they are available on the application software. Users can see the results and detailed visualizations of the common flight data patterns and abnormal flights.

Advantageously, the present invention can be applied for flight safety management. For example, flight data experts can use the invention to analyse flight data in order to detect some unknown potential risks and they can use it together with their current software. When events have been found on a flight, they can check whether it has also been detected as abnormal by the flight data analysis system 200. The visualizations by the graphical user interface 300 can help the flight data expert to investigate and retrieve more information on what could be the reason of those events and most importantly before the happening of any aviation accidents.

Advantageously, the present invention can also be applied for pilot training; for instance, a pilot trainer can use our invention to see whether one of his pilot flight data is showing same pattern with the qualified flight data, which means the pilot data can be included into an existing cluster or detected as anomalous flight data. Then, both the pilot trainer and the pilot can get a side to side comparison on the resulting visualizations output of the system i.e. the graphical representation on the graphical user interface 300.

It will be appreciated by persons skilled in the art that although the embodiments of the present invention are applied in aviation industry, these embodiments may be applied in any other applications such as logistic, chain management with minor modifications and without departing from the concept of the present invention.

It will also be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method of manipulating flight data of a plurality of aircraft, comprising the steps of:
   a. receiving dataset associated with the aircraft from a data management system, wherein the data management system is arranged to store binary flight data associated with different airlines or different aircraft models in different formats, wherein the binary flight data is associated with flight parameters over a phase of flight;
      wherein step a includes step 1a of converting the binary flight data recorded by a local recording means of each of the plurality of aircrafts or different data sources into engineering flight data of a standard format or protocol;
   b. applying an analysis process to compare at least two portions of the received dataset associated with flight parameters over the phase of flight; and
   c. presenting the analyzed data portions to a user in a visualized manner;
wherein step b includes using a clustering method to identify flights following predefined standard operating procedures and at least one anomalous flight represented by non-clustered data patterns identified by the analysis process.

2. A method in accordance with claim 1, wherein step b includes step b1 of identifying common data patterns in the received dataset, wherein the common data patterns represent the flights following the predefined standard operating procedures.

3. A method in accordance with claim 1, wherein step b includes step b2 of detecting anomalies with reference to common data patterns in the received dataset, wherein the anomalies include uncommon data patterns representing the at least one anomalous flight.

4. A method in accordance with claim 1, wherein step b includes step b3 of comparing at least two data patterns each representing different portions in the received dataset.

5. A method in accordance with claim 1, wherein step c includes step c1 of representing the analyzed data graphically whereby two patterns associated with two different portions of the received dataset are visibly distinguishable from each other by a user.

6. A method in accordance with claim 1, wherein step a includes step a2 of removing erroneous data from the engineering flight data.

7. A method in accordance with claim 6, wherein step a includes step a3 of extracting flight sectors of an individual flight from the cleaned flight data.

8. A method in accordance with claim 7, wherein step a includes step a4 of retrieving flight basic information from the extracted flight sectors.

9. A method in accordance with claim 8, wherein step a includes step a5 of storing retrieved flight basic information into database of the data management system.

10. A method in accordance with claim 1, wherein the local recording means includes at least one of the Quick Access Recorder and Flight Data Recorder.

11. A method in accordance with claim 1, wherein the data management system includes a storage unit for storing data.

12. A method in accordance with claim 11, wherein the stored data includes analysis result processed by analysis process in step b.

13. A method in accordance with claim 12, wherein the stored data includes analysis parameters associated with the analysis process in step b.

14. A method in accordance with claim 12, wherein the stored data includes information associated with at least one of the airport, runway, and airline fleet.

15. A method in accordance with claim 1, further including step b0, prior to step b, of configuring analysis parameters.

16. A method in accordance with claim 15, further including step d, following step c, of storing the analysis parameters.

17. A graphical user interface for use with the method in accordance with claim 1.

18. A method in accordance with claim 1, further comprising the step of filtering the at least two portions of the received dataset with one or more filter criteria such that only the analyzed portions of the received dataset with the selected criteria filter criteria is displayed in step c.

19. A method in accordance with claim 18, wherein the one or more filter criteria includes at least one of an aircraft type, an aircraft id, a flight number, a crew id, origin airport and runway, destination airport and runway and take-off date.

20. A method in accordance with claim 18, wherein the one or more filter criteria includes a flight phase or a portion a selected flight.

21. A method in accordance with claim 1, wherein step c includes displaying a representation of the at least one anomalous flight being identified.

22. A method in accordance with claim 21, wherein the representation includes a graphical representation of a trajectory and/or an altitude of the selected flight.

23. A method in accordance with claim 21, wherein the representation includes a statistical comparison of two flight data set, each flight data set is associated with records including at least one of engine parameters, aircraft position, speeds, accelerations, attitudes, control surface position and wind information.

* * * * *